(No Model.)
R. B. WILLIAMS.
CARRIAGE SPRING.
No. 336,971. Patented Mar. 2, 1886.
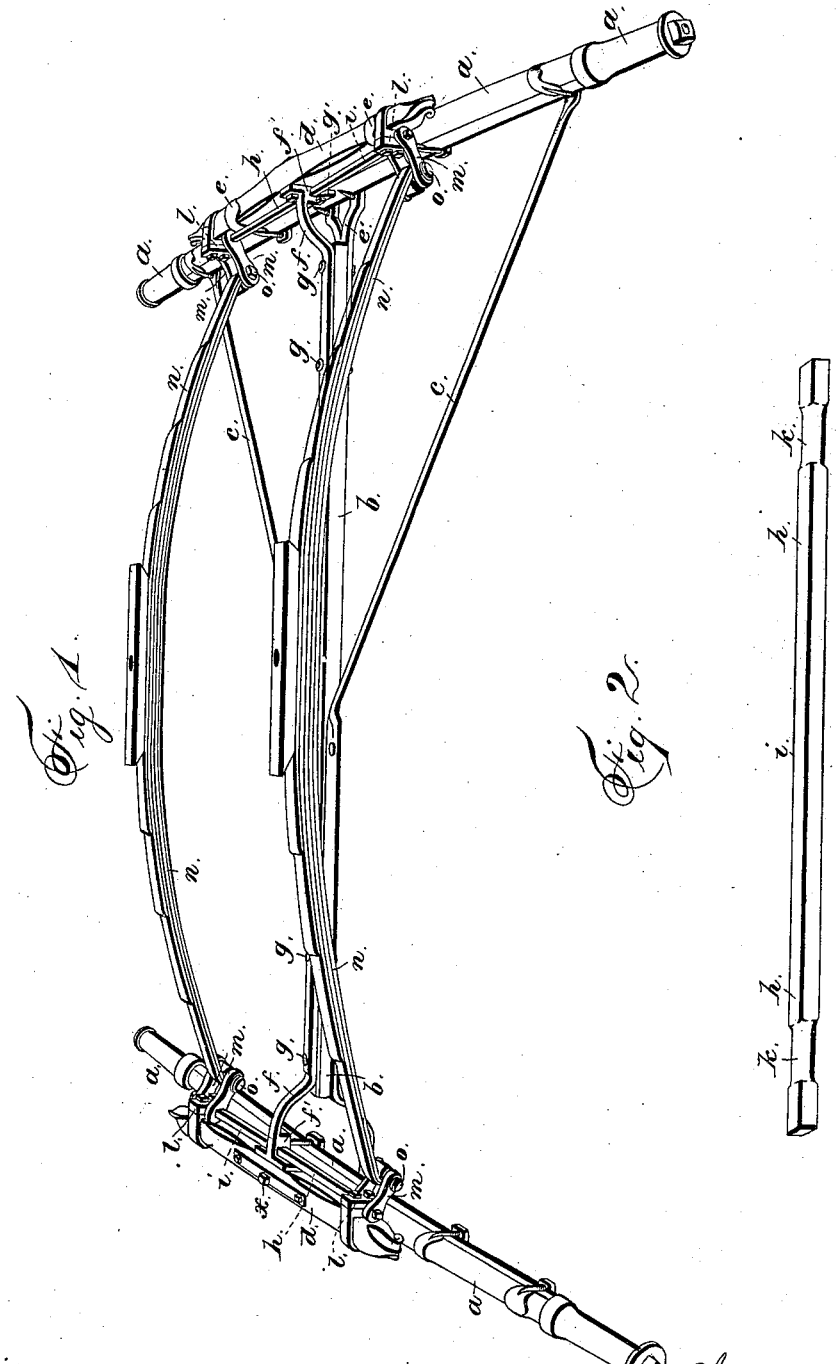

United States Patent Office.

ROBERT B. WILLIAMS, OF JANESVILLE, WISCONSIN.

CARRIAGE-SPRING.

SPECIFICATION forming part of Letters Patent No. 336,971, dated March 2, 1886.

Application filed June 23, 1885. Serial No. 169,569. (No model.)

*To all whom it may concern:*

Be it known that I, ROBERT B. WILLIAMS, of Janesville, in the county of Rock and State of Wisconsin, have invented certain new and useful Improvements in Carriage-Springs; and I do hereby declare the following to be a full, clear, and exact description of the invention, such as will enable others skilled in the art to which it appertains to make and use the same.

My invention relates to an improvement in carriage-springs, the object of the same being to provide a spring by means of which greater ease of motion will be imparted to a vehicle, and also one which will effect increased resistance to the side rocking tendency and end pitch, and at the same time to provide a strong and durable gear, and one which will be simple and economical in construction, durable, and efficient in use; and, with these ends in view, my invention consists in rods rigidly secured at their center to the inside of the vehicle-bolster, the ends of said rods being round and journaled in suitable bearings, and having arms rigidly secured to said ends on each side of the bearings, and semi-elliptical spring pivotally secured to said boxes, whereby the desired objects above noted are secured.

My invention further consists in certain features of construction and combinations of parts, as will be more fully described, and pointed out in the claim.

In the accompanying drawings, Figure 1 is a perspective view of my improvement, showing the same in operating attachment; and Fig. 2 is an enlarged view of one of the rods.

$a$ represents the axles of a wagon or other vehicle, connected by means of the reach-bar $b$, the same being suitably braced by means of the rods $c$. To the top of the rear axle is secured the bolster $d$ by means of the clips $e$, which embrace the axle and bolster, and are fastened thereto in the usual manner. The front bolster is secured to the front axle by means of the king-bolt $x$. The reach-bar $b$ is secured to the rear axle by means of the bifurcated arm $e'$, the said arm being secured to the bottom of the reach-bar and to the axle by means of suitable rivets or bolts. To the upper side of the reach-bar is secured the standard-bearings $f$ by means of the bolts $g$, which pass through suitable holes in the reach-bar and the arms $e'$ and brackets or bearings $f$. If desired, the rods $h$ may be secured directly to the axle by means of the bearings $f$, thus dispensing with the bolster.

The bearing $f$ is preferably constructed as shown, and consists of a clip with a tight or solid box, $f'$, wrought thereon for holding the torsion-rod; or it may consist of a drop-iron having its upper end secured to the bolster or axle by means of suitable bolts or rivets which pass through the arms $g'$, and provided with a perforation made square or rectangular in cross-section and adapted to receive the torsion-rods $h$, which are provided with the rectangular central surfaces, $i$, by means of which they are rigidly held against rotary movement in the said bearings. The outer ends of the rods are provided with the rounded surfaces $k$, and are mounted in the standard-bearings $l$, which are suitably secured to the bolsters $d$. To the rods on each side of the bearings $l$ are rigidly secured the downwardly-projecting arms $m$, provided at their lower ends with perforations. Between the downwardly-projecting arms $m$ are pivotally secured the semi-elliptical springs $n$ by means of the bolts $o$, which pass through the perforations in the arms and the bent ends of the springs.

From the construction above described it will be seen that when a load is brought to bear upon the springs $n$ the arms $m$ will be forced downwardly and outwardly, thus causing the outer ends of the torsion-rods $h$ to turn in the bearings $l$, and as the rods $h$ are held rigidly at their center the effect will be a torsional spring movement, which, taken in connection with the semi-elliptical springs $o$, will afford a steady and comfortable motion to the vehicle.

I would have it understood that I do not limit myself to the exact construction shown and described, but reserve the right to make such changes as properly come within the spirit and scope of my invention—as, for instance, the springs need not be semi-elliptical in shape, but may be of any other desired construction.

I am aware that it is not new to secure torsion-rods to the side bars of a vehicle and connect the vehicle-springs to said rods, and hence I make no claim, broadly, to such a construction; but, Having fully described my invention, what I claim as new, and desire to secure by Letters Patent, is—

The combination, with the axles, the reach-bar, and brackets connecting the axles and reach-bar, of the torsion-rods, substantially as described, rigidly secured at their centers to said brackets, bearings supporting the outer ends of the torsion-rods, arms rigidly secured to the said rods, and the side springs pivotally secured to said arms, all of the above parts combined and operating substantially as set forth.

In testimony whereof I have signed this specification in the presence of two subscribing witnesses.

ROBERT B. WILLIAMS.

Witnesses:
E. D. McGOWAN,
CHAS. FRENDWEILER.